June 13, 1967 W. J. GLASER 3,324,900
WIRE FABRIC FORMING APPARATUS
Filed March 19, 1964 5 Sheets-Sheet 5
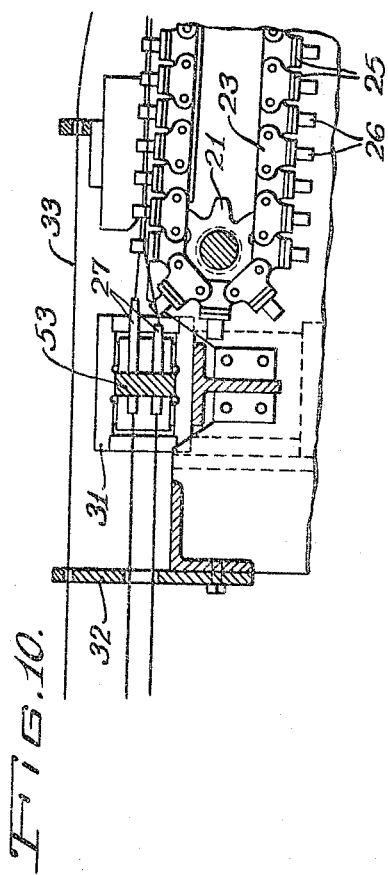
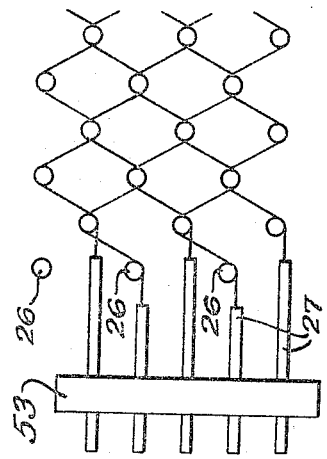
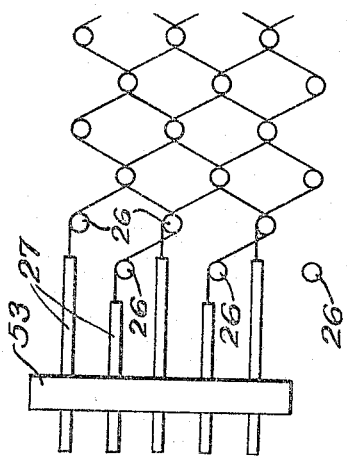
Inventor:
Wesley J. Glaser United States Patent Office 3,324,900
Patented June 13, 1967

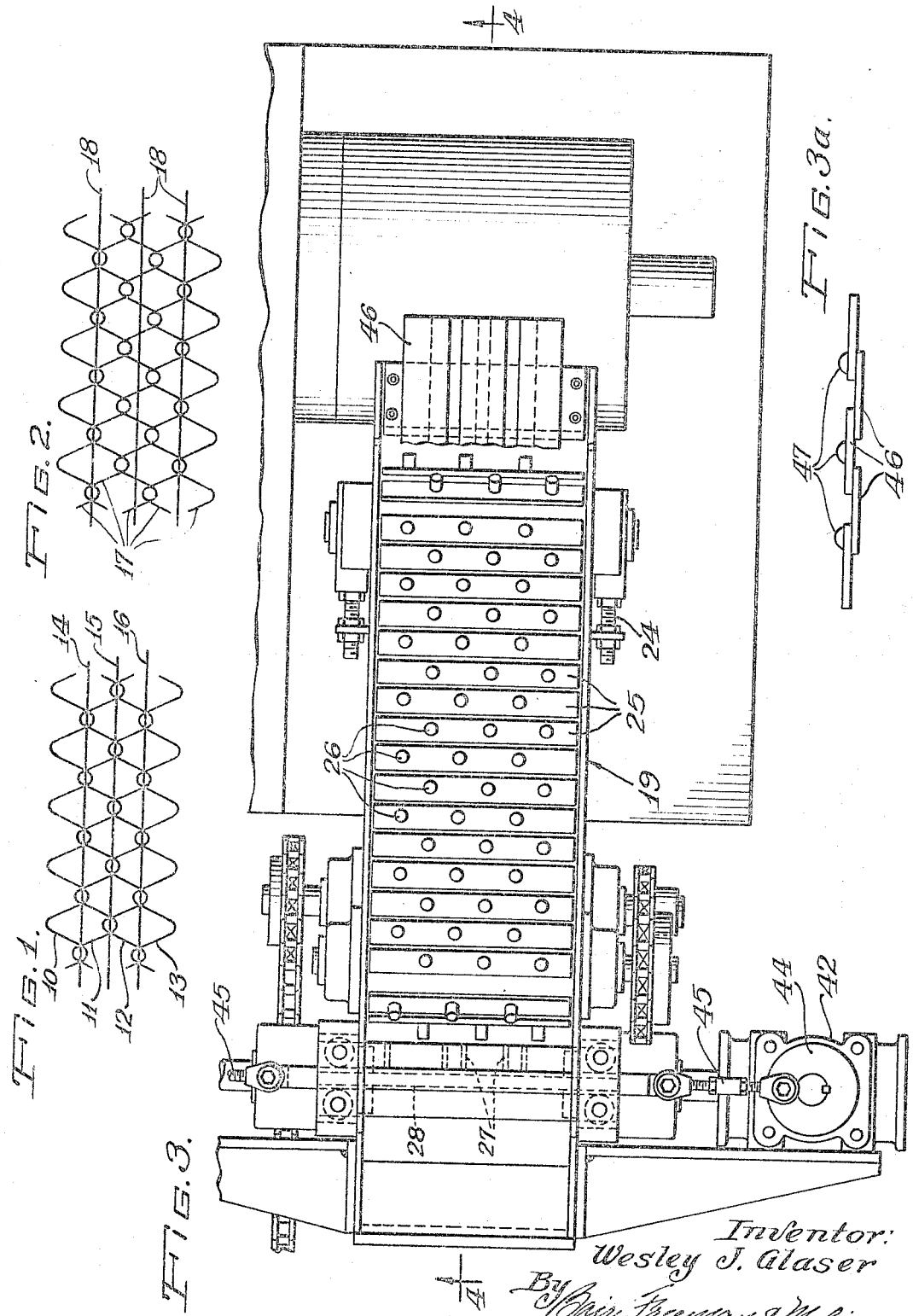

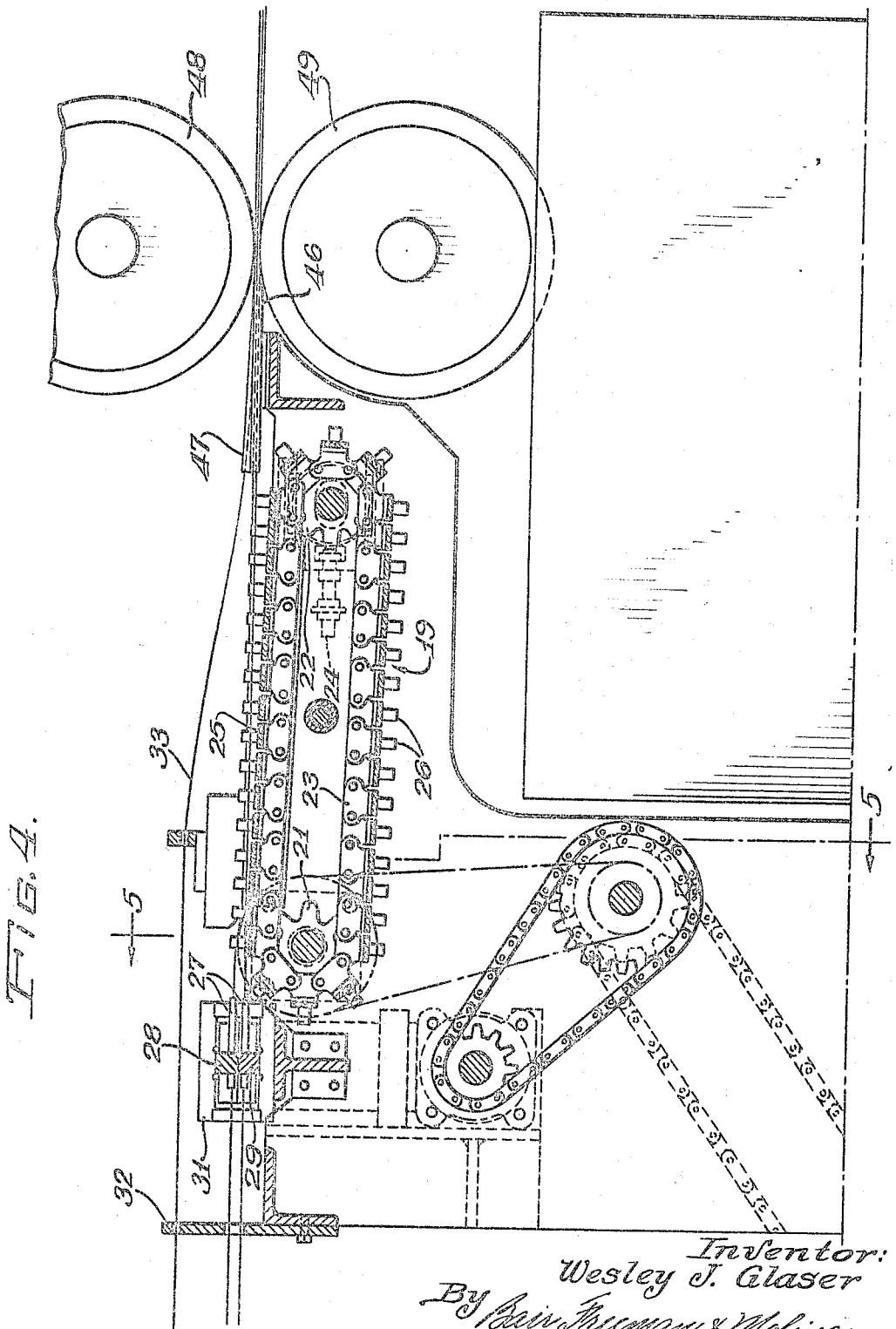

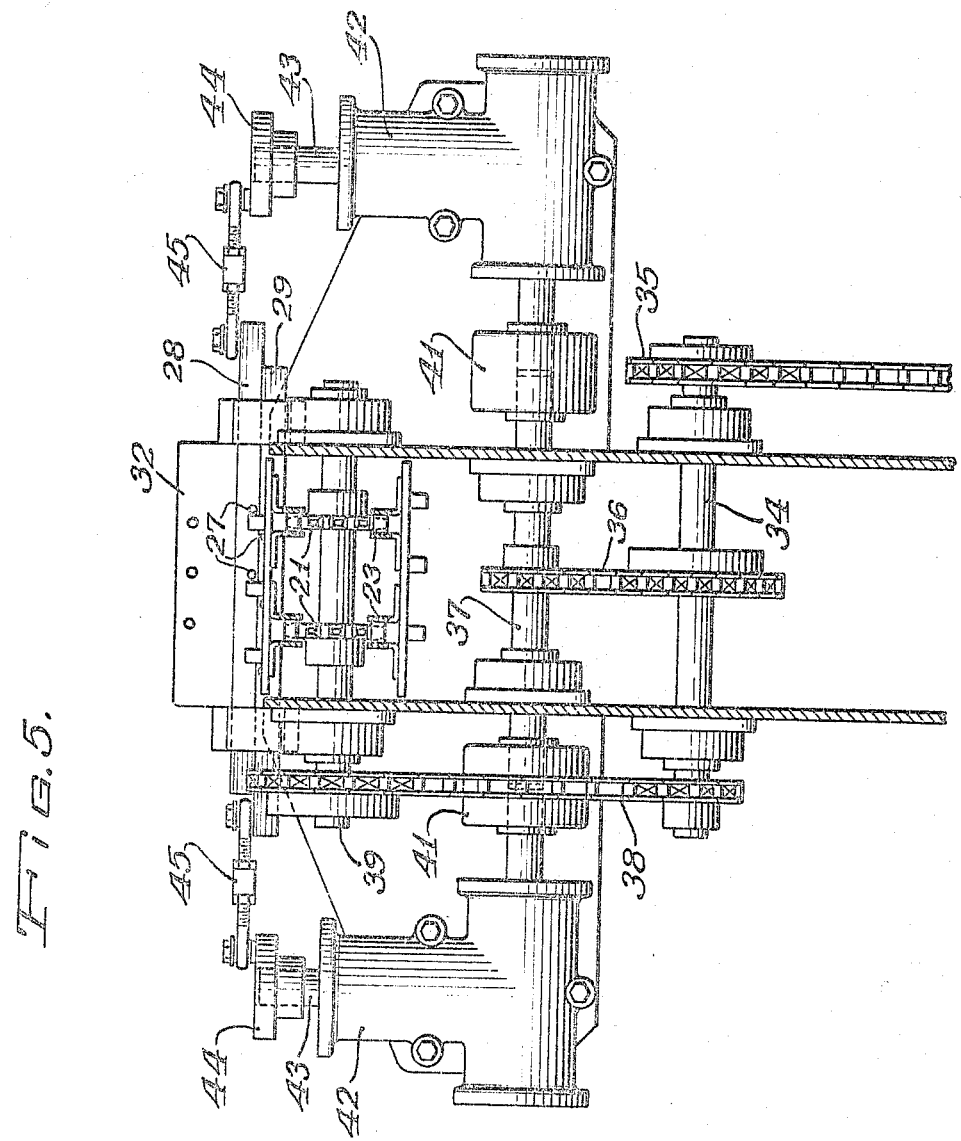

3,324,900
WIRE FABRIC FORMING APPARATUS
Wesley J. Glaser, London Mills, Ill. 61544
Filed Mar. 19, 1964, Ser. No. 353,112
14 Claims. (Cl. 140—112)

This invention relates to wire fabric forming apparatus and more particularly to a machine for automatically and continuously forming a fabric of sinuously bent wires overlapping each other and welded together at the points of overlap.

Wire fabric has long been known of a type formed by a plurality of sinuously bent wires overlapped and welded together either with or without line wires welded thereto. Such fabrics have been formed on various types of machines, but the wires have been difficult to bend accurately and to maintain in accurate overlapping relationship until they are welded. It has therefore been difficult to produce satisfactory fabric of this type, especially at high speed.

It is accordingly one of the objects of the present invention to provide a wire fabric forming apparatus which forms wire fabric of sinuously bent overlapping wires accurately and in a high speed continuous operation.

Another object is to provide wire fabric forming apparatus in which separate wires are fed onto pins on a traveling conveyor and are bent around the pins to form the wires into sinuous shapes in which the sinuously bent wires are passed directly through welding rollers to be welded together at points of overlap.

According to a feature of the invention, the wires are guided either by a single guide block or by a plurality of guide blocks simultaneously reciprocated in opposite directions in synchronism with movement of the conveyor to bend the wires over the opposite sides of spaced pins on the conveyor thereby producing sinuous bends in the wires with the tips of the bends in overlapping relationship. Line wires may be fed in over the conveyor to meet the sinuously bent wires at the welding rolls and to be welded thereto.

According to another feature of the invention, the conveyor lies at an angle to a plane between the wire guides and the welding rolls so that the wires will be lifted from the pins at the discharge end of the conveyor for free removal from the conveyor and entrance into the welding rolls.

According to a further feature of the invention, the individual sinuously bent wires are received in separate guide troughs as they leave the conveyor and are individually guided into the welding rolls. By this construction, the degree of overlap between the adjacent sinuously bent wires can be accurately controlled and an extremely uniform fabric is produced.

The above and other objects and features of the invention will be more readily apparent from the following description when read in connection with the accompanying drawings, in which:

FIGS. 1 and 2 are partial views of different types of fabric which may be produced on the apparatus of the invention;

FIG. 3 is a top plan view with parts broken away of an apparatus embodying the invention;

FIG. 3a is a partial end view looking into the guide troughs of FIG. 3;

FIG. 4 is a central section of the apparatus of FIG. 3 on the line 4—4 of FIG. 3;

FIG. 5 is a partial section showing the drive mechanism on the broken line 5—5 of FIG. 4;

FIG. 10 is a partial view similar to FIG. 4 illustrating an alternative construction; and FIGS. 11 and 12 are diagrammatic views illustrating different positions of the wire guide means of FIG. 10.

Figure 6:
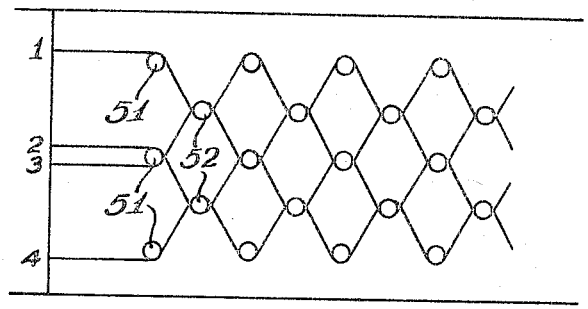
FIGS. 6, 7, 8 and 9 are diagrammatic views indicating different steps in the formation of the fabrics of FIGS. 1 and 2, respectively.

The apparatus, as shown, is particularly designed to form a fabric, as shown in either FIG. 1 or FIG. 2, the difference being in the width of the fabric and in placement of the line wires. It will be understood, of course, that the machine of the present invention can be made of any desired size to form a fabric of any desired width and containing any desired number of sinuously bent wires either with or without line wires.

The fabric, as shown in FIG. 1, is formed of four sinousuly bent wires 10, 11, 12 and 13 and three line wires 14, 15 and 16. Each of the sinuously bent wires is bent into approximately a sine curve and each wire is longitudinally offset with respect to the adjacent wire so that the tip portions of the loops therein will overlap. The overlap may be controlled both to alter the characteristics of the fabric as to size of openings therein and the width of fabric obtained with a given number of wires whose bends are of a predetermined depth. The line wires 14, 15 and 16 extend lengthwise of the fabric and as shown cross the overlapping portions of the sinuously bent wires. The several wires are welded to each other at each of the points at which they cross to define a completed fabric.

The fabric of FIG. 2 is substantially similar to that of FIG. 1, but includes five sinuously bent wires 17 and three line wires 18. In this case, the sinuously bent wires 17 overlap each other and are welded together in the same manner as the sinuously bent wires of FIG. 1. The outermost line wires cross the sinuously bent wires in their overlapping portions as in FIG. 1, but the center line wire extends along the median portion of the central sinuously bent wire 17 and is welded thereto without crossing the overlapping portions of the sinuously bent wires. It will be apparent that may other combinations of sinuously bent wires and line wires could be devised and those shown are for illustration only.

Fabrics are formed on a machine, as best shown in FIGS. 3 to 5, which comprises an elongated conveyor, indicated generally at 19. As shown in FIG. 4, the conveyor is formed by a pair of end sprockets 21 and 22 over which one or more link conveyor chains 23 are trained. In the construction shown, the sprockets are double and two conveyor chains extend over them, as best seen in FIG. 5. Preferably the sprocket 22 is adjustable through an adjusting mechanism, indicated at 24, to maintain the chains tight.

Each of the links in sprocket chains carries a cross bar 25 whose length determines the width of fabric which can be formed upon the machine. The specific machine shown in FIGS. 3 to 5 is adapted to form a five wire fabric, as illustrated in FIG. 2, and in this machine each of the cross bars 25 carries three pins 26 spaced along the length thereof. As best seen in FIG. 3, the pins in adjacent cross bars are offset widthwise of the conveyor relative to each other.

Individual wires to be sinuously bent in the formation of the fabric are fed into the conveyor at its left end, as seen in FIGS. 3 and 4, through separate guide tubes 27. Two guide tubes 27 are carried by an upper guide bar 28 and other three guide tubes are similarly carried by a lower guide bar 29 which are mounted one above the other, as best seen in FIGS. 4 and 5. The guide bars are supported for longitudinal reciprocation and as will be explained more fully hereinafter are adapted to reciprocate simultaneously in opposite directions to guide the wires in the desired pattern. The guide bars are supported in a guiding head structure 31 which is mounted on the frame of the machine adjacent to the supply end of the conveyor. Additionally, the guide plate 32 is supported on the frame and is formed with guide openings therein for receiving and guiding line wires, as indicated at 33 in FIG. 4.

The guide bars 27 and 28 are reciprocated by drive mechanism, as more particularly shown in FIG. 5. As shown in this figure, a shaft 34 is driven by a motor, or the like, through a sprocket 35 and is drivably connected through a sprocket chain 36 to a shaft 37 to drive it. Similarly, the shaft 34 is drivably connected through a sprocket chain 38 to a shaft 39 on which the end sprockets 21 for the conveyor are secured, thereby to drive the conveyor.

The shaft 37 extends through both sides of the machine frame and is connected through couplings 41 to the input shafts of angle drive units 42. Each of the angle drive units 42 has a vertical shaft 43 extending upwardly therefrom and carrying a head 44 on which a crank pin is mounted. The crank pins are connected respectively through connecting rods 45 to pins on the ends of the slide bars 28 and 29, respectively, and the pins, as seen in FIG. 3, are displaced 180° from each other so that they will cause the slide bars to reciprocate simultaneously in opposite directions.

At the discharge end of the conveyor the sinuously bent wires are removed therefrom into individual guide troughs 46, as best seen in FIGS. 3 and 3a. The guide troughs, as shown in FIG. 3a, are in overlapping relation with each other and may be adjustable laterally to adjust the degree of overlap between adjacent sinuously bent wires. The guide troughs further carry guide loops or strips 47 into which the line wires 33 are received so that the line wires will be guided in proper relationship with the sinuously bent wires.

The guide troughs direct the wires into the bight of a pair of welding rolls 48 and 49 which are connected in a welding circuit in a conventional manner so that the wires will be welded together at the points of overlap thereof. As will be seen in FIG. 4, the guide troughs hold the wires in the desired relationship to a point extremely close to the bite of the welding rolls so that the fabric will be formed accurately and uniformly without any possibility of slipping of the wires out of the desired relationship.

According to one feature of the invention the conveyor is positioned so that its upper surface lies in a plane at an acute angle to a line between the guide tubes 27 and the guide troughs 46, as best seen in FIG. 4. With this construction, the pins 26 on the conveyor project sufficiently high to insure that they will catch the wires fed onto the conveyor through the guide tubes so that the wires will be sinuously bent in the desired manner. As the bent wires travel along with the conveyor they will tend to be lifted from the pins and will be free of the pins by the time they reach the discharge end of the conveyor so that the wires may pass freely into the guide troughs 46. It will be noted in this connection that the only tension of the wires against the pins after the initial bend is the residual bending stress in the wires, which is relatively small, so that the wires can be slid from the pins without difficulty. This feature not only speeds up operation of the machine, but minimizes bending of the wires after their initial bending so that the wires will tend to stay in the desired relationship.

Figure 7:
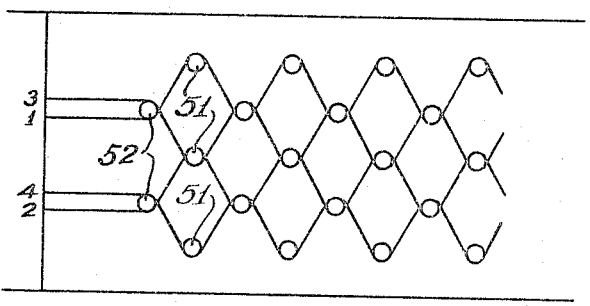

FIGS. 6 and 7 illustrate diagrammatically formation of the sinuous wires in the fabric of FIG. 1. In forming this fabric, alternate cross bars on the conveyor carry three pins 51 and two pins 52, as shown. The four wires numbered 1, 2, 3 and 4 are fed through guide tubes with wires 1 and 2 going through guide tubes on one of the guide bars and wires 3 and 4 going through guide tubes on the other guide bar. When a conveyor crossed bar having three pins 51 thereon is moved into position to receive the wires, the guide bars are slid to direct the wires onto the conveyor, as shown in FIG. 1. In this position, wires 1 and 2 pass above the upper two pins 51 while wires 3 and 4 pass below the lower two pins 51.

When the conveyor has moved forward the distance of one cross bar, the guide bars have moved to their opposite extreme position, as indicated in FIG. 7. In this position, wires 1 and 2 will be guided beneath the respective two pins on the cross bar while wires 3 and 4 will be guided above the same two pins. It will be seen that in continuous operation of the apparatus with the conveyor moving and the guide bars reciprocating in timed relation, the four wires will be bent around the pin to a sinuous configuration with the wires overlapping each other in the general manner desired in the final fabric.

Figure 8:
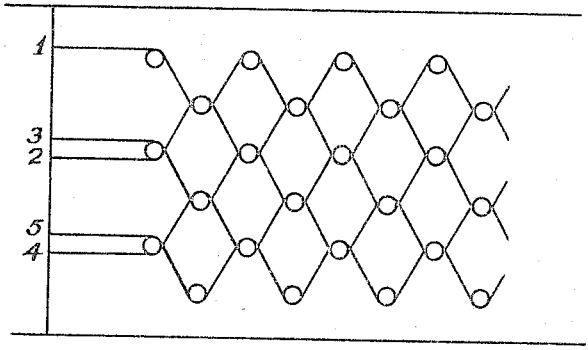
Figure 9:
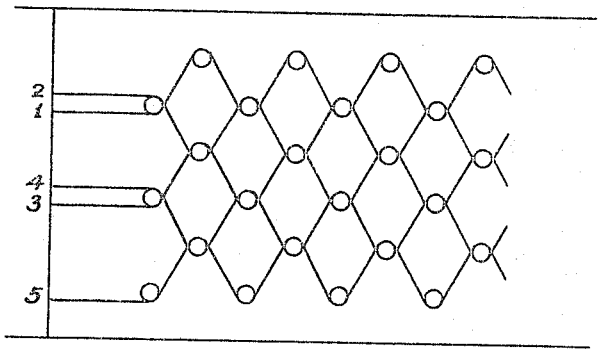

For forming a five wire fabric, as shown in FIG. 2, the operation is as illustrated in FIGS. 8 and 9. In this construction wires 1, 3 and 5 are guided by guide tubes on the lower slide 29 and wires 2 and 4 are guided by guide tubes on the upper slide 28. In one position, when the three pins on the adjacent cross bar are up, as shown in FIG. 8, the lower guide bar is also up to guide wires 1, 3 and 5, respectively, above the three pins. The upper slide is down to guide wires 2 and 4 beneath the lower two pins, respectively. When the conveyor has moved the distance of one cross bar, the slides have reversed so that the lower guide bar will guide wires 1, 3 and 5 beneath the three pins and guide wires 2 and 4 above the upper two pins. It will be seen that this operation can be performed continuously by high speed accurately to form a five wire fabric as shown in FIG. 2. It will be understood, of course, that additional wire guides and additional pins on the conveyor could be provided to form wider fabrics using a greater number of wires substantially without limit.

FIGS. 10 to 12 illustrate an alternative construction employing a single guide bar rather than the two guide bars 28 and 29 of FIGS. 1 to 9. Parts in FIG. 10 corresponding to like parts in the preceding figures are indicated by the same reference numerals for brevity of description. In this construction, the two guide bars 28 and 29 are replaced by a single guide bar 53 which is of greater depth than the guide bars 28 and 29 and which, as shown, for forming a five wire fabric carries all five guide tubes 27. In this construction, however, the lower two guide tubes 27 are at a level below the top plane of the conveyor and are substantially shorter than the upper guide tubes 27, as seen in FIG. 10. In the operation of this device, wires guided by the lower guide tubes will engage pins which are still traveling around the sprockets 21, as seen in FIG. 10, while wires guided by the upper guide tubes 27 will not engage these pins until they reach the flat upper plane of the conveyor.

Operation of the apparatus to form a five wire fabric will be apparent from FIGS. 11 and 12. As seen in FIG. 11, the lower guide tubes 27 will guide the two wires guided thereby above the upper two pins 26 on a conveyor bar which is rising at the inlet end of the conveyor while the upper three tubes 27 will guide the remaining three wires above the three pins 26 which have already reached the upper plane of the conveyor and precede the pins 26 which are still rising around the sprocket. As the conveyor travels the guide bar 53 will be shifted downward to the position shown in FIG. 12 in which the two wires guided by the lower guide tubes 27 will pass below the pins 26 of the next conveyor cross bar as it rises around the sprocket. Similarly, the three wires guided by the upper guide tubes 27 will pass below the three pins of the preceding cross bar which has by then reached the flat upper surface of the conveyor. It will be seen that as this operation continues, the wires will be sinuously bent around the pins in an overlapping pattern substantially identical to the pattern produced by the machine of FIGS. 1 to 9. With either construction, the fabric can be formed at high speed and with a high degree of accuracy.

While two embodiments of the invention have been shown and described herein, it will be understood that they are illustrative only and not to be taken as a definition of the scope of the invention, reference being had for this purpose to the appended claims.

What is claimed is:

1. Wire fabric forming apparatus comprising a traveling conveyor defining an upper surface, a plurality of pins projecting upwardly from the upper surface and lying in rows extending transversely of the conveyor with the pins in adjacent rows staggered relative to each other, wire guide means mounted for reciprocation transversely of the conveyor at the supply end of the conveyor including two sets of guide elements, each set including a plurality of guide elements spaced transversely of the conveyor and the two sets guiding individual wires onto the pins of different rows, means for continuously driving the conveyor and for simultaneously reciprocating the guide means in timed relation with conveyor movement to guide wires passing through the guide elements of the different sets on opposite sides of pins in adjacent rows to bend each of the wires sinuously in an overlapping pattern, and welding rollers receiving the wires from the conveyor and welding overlapping portions thereof to each other.

2. The apparatus of claim 1 in which the upper surface of the conveyor slopes away from a plane between the guide tubes and the bight of the welding rollers whereby the wires will be lifted from the pins at the discharge end of the conveyor.

3. Wire fabric forming apparatus comprising a traveling conveyor defining a substantially flat upper surface, a plurality of pins projecting upwardly from the upper surface and lying in rows extending longitudinally of the conveyor and with the pins in adjacent rows staggered with respect to each other, a pair of guide blocks at the supply end of the conveyor each having a plurality of guide tubes spaced transversely of the conveyor, means for shifting the guide blocks transversely of the conveyor simultaneously in opposite directions in synchronism with movement of the conveyor to guide wires passing through the guide tubes on the opposite sides of pins in different rows as the conveyor moves, and welding rollers receiving the wires from the conveyor and welding overlapping portions thereof to each other.

4. The apparatus of claim 3 including means to feed line wires over the conveyor and into the welding rollers to be welded to the first named wires.

5. The apparatus of claim 3 in which the flat upper surface of the conveyor slopes downwardly relative to a plane including the upper surface at the supply end of the conveyor and the bight of the welding rollers whereby the wires will be lifted from the pins at the discharge end of the conveyor.

6. Wire fabric forming apparatus comprising a conveyor including a pair of end sprockets and an endless flexible loop extending over the end sprockets and defining a flat upper surface traveling from a supply end to a discharge end of the conveyor, a plurality of pins projecting outwardly from the loop in longitudinally extending rows and with the pins in adjacent rows staggered relative to each other, a pair of guide blocks slidable transversely of the conveyor at the supply end thereof, a plurality of guide tubes carried by each of the guide blocks for guiding wires onto the flat upper surface of the conveyor, means to shift the guide blocks simultaneously in opposite directions in synchronism with movement of the conveyor to guide the wires on opposite sides of the pins in different rows in overlapping zig-zag patterns, and welding rollers receiving the wires from the conveyor at the discharge end thereof and welding the wires together.

7. The apparatus of claim 6 in which the guide blocks lie one above the other beyond the supply end of the conveyor with the guide tubes being at a level below the tops of the pins so that the pins rising around the sprocket at the supply end of the conveyor will engage the wires at one side or the other of the pins.

8. The apparatus of claim 6 in which the flat upper surface of the conveyor slopes downwardly relative to a plane from the guide tubes to the welding rollers so that the wires will be raised from the pins at the discharge end of the conveyor.

9. The apparatus of claim 6 including power means to drive the conveyor, and a pair of cranks drivably connected to the power means and operatively connected to the guide blocks to shift them.

10. The apparatus of claim 6 including means to feed line wires over the conveyor and into the welding rollers to be welded to the first named wires.

11. The apparatus of claim 6 including a plurality of overlapping guide chutes receiving the sinuously bent wires respectively from the conveyor and guiding them in overlapping relationship into the welding rollers.

12. The apparatus of claim 1 in which the guide elements of the different sets are at different levels and are so positioned that the guide elements at the lower level guide wires onto the pins at the supply end of the conveyor and the guide elements at the higher level guide wires onto pins immediately downstream from said pins at the supply end of the conveyor.

13. The apparatus of claim 1 in which the conveyor comprises end sprockets with an endless flexible loop running over the sprockets and the guide elements of the different sets are at different levels and are so positioned that the lower guide elements are at a level below the conveyor upper surface to feed wires onto pins rising around the adjacent end sprocket and the upper guide elements are at a higher level to clear said rising pins and to feed wire onto pins on said upper surface.

14. The apparatus of claim 12 in which the conveyor upper surface slopes away from the plane in which the wires lie whereby the wires will be lifted away from the pins adjacent to the discharge end of the conveyor.

References Cited

UNITED STATES PATENTS

| | | | |
|---|---|---|---|
| 1,908,050 | 5/1933 | Reed | 140—112 |
| 2,077,061 | 4/1937 | White | 140—112 |
| 2,160,715 | 5/1939 | Blaisdell et al. | 140—112 |
| 2,191,682 | 2/1940 | Reed | 140—112 |
| 2,633,877 | 4/1953 | Stockton | 140—112 |
| 2,700,991 | 2/1955 | Stockton | 140—105 |

CHARLES W. LANHAM, *Primary Examiner.*

E. M. COMBS, *Assistant Examiner.*